May 8, 1945.   C. H. O. WITTIG   2,375,399
APPARATUS FOR MOUNTING OPTICAL ELEMENTS
Filed July 1, 1943

CARL H. O. WITTIG
INVENTOR
BY
ATTORNEYS

Patented May 8, 1945

2,375,399

UNITED STATES PATENT OFFICE 2,375,399

APPARATUS FOR MOUNTING OPTICAL ELEMENTS

Carl H. O. Wittig, Irondequoit, N. Y., assignor to Bausch & Lomb Optical Company, Rochester, N. Y., a corporation of New York Application July 1, 1943, Serial No. 493,014

2 Claims. (Cl. 88—14)

This invention relates to optical instruments, and more particularly to an apparatus for mounting optical elements.

In mounting certain optical elements such as prisms and lenses, the elements are often placed in holders which circumscribe the same. The holders must fix the elements against movement and yet have an opening of such a size and shape that the element can be mounted therein so that the holder can embrace the edge face or faces of the elements.

It has been difficult to form the holder and the element with sufficient accuracy to permit the ready insertion of the element in the holder with the assurance that sufficient pressure is exerted by the holder to render the element immovable. Heretofore, due to the difficulty of accurately forming the holder and the element, it has been often necessary to file the element-engaging surfaces to cause the same to properly mount the element.

In this manner of mounting the elements, the operations incident thereto are laborious and haphazard in that the operator must necessarily use cut and try methods in the assembly of the element in its holder. Thus, the difficulties presented in this tedious and time-taking method of positioning the element in the holder has complicated the assembly of instruments, and thereby greatly increased the manufacturing costs of these precision instruments.

The present invention has for its primary object the obviating of these difficulties by providing a simple apparatus for mounting an optical element in a holder.

The apparatus of the present invention permits the operator to readily mount the optical element in the holder by providing means for deforming the holder sufficiently to receive and embrace the element. If any strain is induced in the mounted element by the elasticity of the holder, it is quickly seen by the operator as the mounting operation is performed in polarized light, and is easily removed by elongating the holder.

In this manner, the apparatus of the present invention permits the ready and easy mounting of the optical element in a holder free from strain. The present invention will, therefore, eliminate the complicated cut and try method heretofore necessary for mounting the element in a holder in a strain-free condition and provides a simple apparatus for securing these results at a substantial saving in the manufacturing costs of optical instruments.

Other objects and advantages of the present invention will appear from the following description taken in connection with the accompanying drawing in which.

Figure 1:
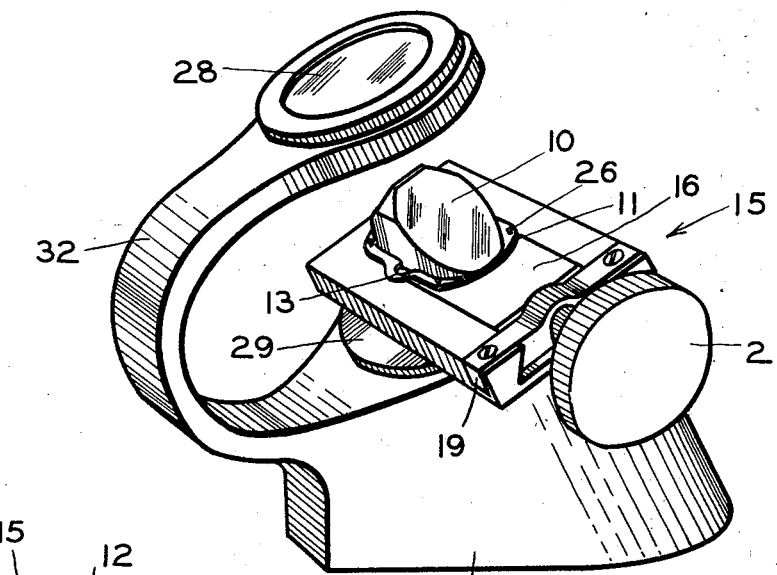
Fig. 1 is a perspective view of the apparatus embodying the present invention.

In the illustrated embodiment of the invention, wherein 10 designates a prism mounted in a holder 11, the peripheral edges of the base of the prism 10 are disposed within an opening in the holder 11 and the side faces thereof are engaged by four pads 12 formed integral with the holder 11.

The holder is generally stamped or otherwise formed from metal, or other materials, having a high coefficient of longitudinal elasticity. As these holders are primarily formed to hold the prisms against movement, the pads 12, through the action of spring portions 13 of the holder 11, exert sufficient pressure to attain this end. Also the spacing of the pads 12 on the holder will insure the immobility of the prism, as the four pads grip the corners of the prism through the action of the spring portions of the holder. Thus the prism is immovably held by the holder 11.

The present invention, in its preferred embodiment, provides an efficient apparatus and method for mounting the prism in the holder free from strain. The simple apparatus for practicing my new method is illustrated in the drawing in which the numeral 14 designates a base supporting a table 15. A slide member 16 is mounted in the table 15 and is reciprocable therein through engagement of its sides with a horizontal groove 17 formed in the table 15, as shown in Figs. 2 and 3.

To secure movement of the slide member 16, a threaded shaft 18, journaled in a block 19 suitably fastened in slots in the table 15, engages a tapped opening in the slide member 16 and, through the rotation of a handwheel 21 fixed to one end of the shaft, causes longitudinal movement of the slide member 16 in the horizontal groove 17. The shaft 18 is held in place against longitudinal movement by a pin 22 extending through a collar 23 threaded on the shaft 18 on one side of the block 19 and by an enlarged portion 24 formed on the shaft 18 engaging the other side of the block 19.

Figure 2:
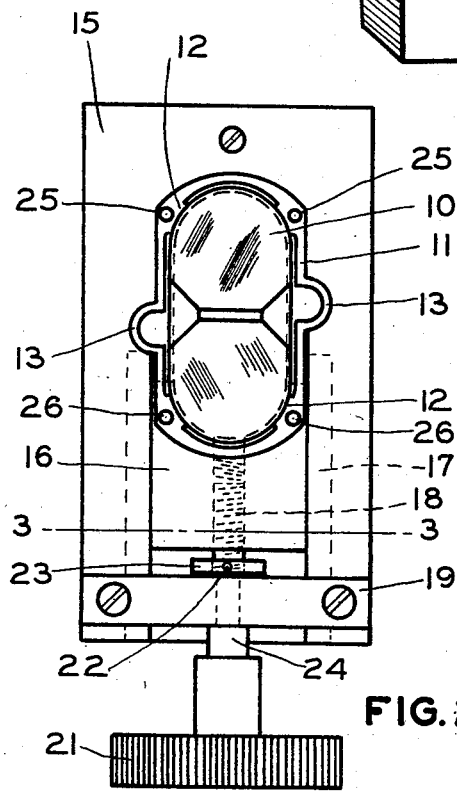
Fig. 2 is a top plan view of the apparatus.
Figure 3:
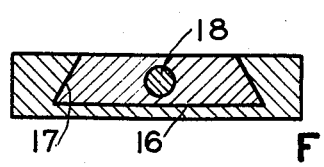
Fig. 3 is a view taken on line 3—3 of Fig. 2.

To mount the holder 11 on the table 15 and the slide member 16, two pins 25, fixed to the table 15, and two pins 26, fixed to the slide member 16, are adapted to engage spaced holes in the holder 11, as shown in Fig. 2. The slide member may be moved to bring about the coincidence of the pins 26 with the holes of the holder disposed nearest them for engagement of the same.

At this time, due to the variations in the dimensions of the holder and the prism, two conditions may exist. In the one case, the opening in the holder 11 may be smaller than the area of the hypotenuse surface of the prism, preventing insertion of the prism in the holder; and in the second case, the opening in the holder may be larger than the area of the hypotenuse surface of the prism, so that the prism will not be held by the holder. The apparatus of the present invention is adapted to remedy these variations in the holder and prism so that the prism may be mounted in the holder.

Figure 4:
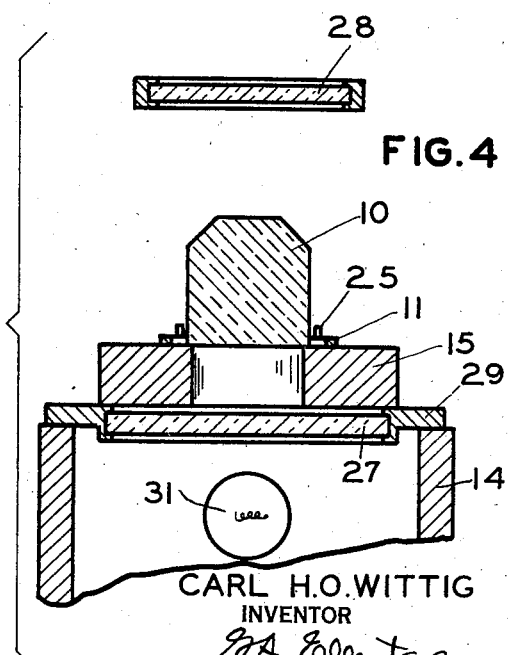
Fig. 4 is a vertical section of the apparatus, with the support for the upper polarizing element not shown.

In the first case, the prism is readily mounted in the holder by the following operation. After the holder has been mounted on the table 15 and the slide member 16, the handwheel 21 may be rotated to move the slide member in the table 15 towards the handwheel 21 to thereby forcibly stretch the holder 11 through its spring portions 13 until the opening in the holder 11 is elongated to a shape readily receiving the prism 10. Upon the release of the stretching action on the holder 11 by the slide member being moved in an opposite direction by the handwheel 21, the four pads 12 of the holder 11 will engage the prism 10 and hold the prism securely within the opening of the holder. As shown in Fig. 4, when the prism is mounted in the holder, the flush mounting surfaces of the table 15 and the slide member 16 evenly engage the flush surfaces of the prism 10 and the holder 11 so that the prism will be held in axial alignment with the holder 11.

In the event that the opening in the holder 11 is larger than the area of the hypotenuse surface of the prism, so that the prism will not be held by the holder, the prism is removed and the handwheel 21 is rotated in a counterclockwise direction to cause the slide member 16 to compress the spring portions 13 beyond the limits of elasticity to contract the holder 11. Upon release of the pressure, the holder may assume a shape prohibiting the insertion of the prism in the opening in the holder. The holder is then stretched until it will receive the prism, the consequent release of the stretching action causing the holder to securely grip the prism.

The longitudinal displacement of the holder 11, in the above operations, by the slide member 16 induces strain in the spring portions 13 of the holder 11. As a result, the spring portions 13 will either expand or contract to cause a longitudinal displacement of the holder to either lengthen or shorten the distance between the pads located on the table 15 and the pads located on the slide member 16. By this expansion and contraction of the spring portions 13, the holder 11 will assume a shape and form where the pads will properly grip and hold the prism upon the release of the strain imparted to the spring portions.

Thus, the apparatus of the present invention will permit the holder 11 to be altered in shape and form to receive and hold the prism to thereby remedy the variations in the dimensions of the holder and the prism.

If strain is induced in the mounted prism by the gripping action of the holder 11, the operator readily perceives the strain as the foregoing mounting operation is performed in polarized light. The apparatus of the embodiment of the present invention, shown in the drawing, provides for the perception of the induced strain in the prism, in that, the table 15, carrying the mounted prism and the slide member 16, is secured between a polarizer 27 and an analyzer 28. Although the polarizing elements may comprise any conventional type employed for this purpose, the elements in the present embodiment of the invention are sheets or films sold under the trade name "Polaroid" and so mounted that the analyzer 28 is disposed with its axis normal to the polarizer 27.

As shown in Figs. 2 and 4, the table 15 and the slide member 16 are so formed that an aperture is had therein conforming to the shape of the prism mounted in the holder 11. The prism 10 is held in the holder 11 with the marginal edges of the hypotenuse face of the prism engaging the edges of the table 15 and the slide member 16 defining the aperture. The table 15 is suitably fastened to a circular plate 29 mounted on the hollow base 14. The polarizer 27 is secured within an aperture in the plate 29 and has disposed beneath it a light source or lamp 31. The lamp 31 is mounted in the hollow base 14 to provide illumination of the optical elements. The analyzer 28 is mounted in the upper extremity of a curved member 32 extending upwardly from the hollow base 14.

The analyzer 28, the polarizer 27 and the prism 10 are so aligned that light rays from the light source 31 passing therethrough will visually indicate the absence or presence of strain in the prism 10.

If strain is induced in the prism 10 by the holder 11, the strain may be easily removed by the operator by rotating the handwheel 21 to cause the spring portions 13 to be stretched beyond the limits of their elasticity, while the extent of strain existent in the prism is observed.

When the stretching action is released, the consequent elongation of the holder 11 will free the mounted prism from strain, while exerting sufficient pressure to securely hold the prism. It is readily apparent that by the observation of the mounted prism in the polarized light, the stretching action, elongating the holder, may be controlled in proportion to the strain existent in the prism until the strain is freed in the prism.

Thus the apparatus of the present invention, as illustrated in its preferred embodiment, readily permits the prism to be mounted in the holder free from strain. In so doing, the simple apparatus of the present invention provides an easy and efficient method for the previous tedious and time-taking operation for mounting the prism in the holder and simplifies the otherwise complicated assembly of the prism mounting at a substantial saving in the manufacturing costs of prismatic instruments.

It will be understood that the apparatus of the present invention is not limited to employment for the particular purposes which are disclosed, as they can be used in the mounting of any optical element in an elastic holder.

From the foregoing it will be apparent that I am able to attain the objects of my invention and provide a new apparatus and method for mounting an optical element in an elastic holder. Various modifications and alterations of structure and procedure can, of course, be made without departing from the spirit of my invention or the scope of the appended claims.

I claim:

1. A device of the type described comprising a base, means on the base for providing a beam of polarized light, a table mounted on the base and in the beam of polarized light, a member slidably mounted to move back and forth on the table, means for securing to the table and the member the respective ends of a deformable mounting which extends around an optical element, said table and member having openings whereby polarized light rays may pass through said element, an analyzer mounted on the base and located above the table and in alignment with the element and means for moving the member relative to the table whereby the mounting may be adjusted so as to hold the element without substantial strain patterns being visible through the analyzer.

2. A device for securing optical elements to mountings so that the elements will be substantially free from strain, said device comprising a base, a light source in the base, a polarizer positioned on the base above the light source, a table carried by the base above the polarizer, a slide member slidably mounted to move back and forth on the table, means on the table for holding one portion of a deformable mounting, means on the member for holding another portion of the mounting, a rotatable screw for adjustably moving the member relative to the table whereby the mounting may be adjustably expanded or contracted to hold an optical element, said table having an opening whereby polarized light may pass through the element, and an analyzer carried by the base and positioned above the element whereby any strain on the element will be detected by the presence of strain patterns in the analyzer and will guide the operator in adjustably forming the mounting to hold the element substantially free from strain.

CARL H. O. WITTIG.